United States Patent [19]

Ende

[11] Patent Number: 4,788,559

[45] Date of Patent: Nov. 29, 1988

[54] APPARATUS AND METHOD FOR REMOVING AN IMAGE FROM THE RIBBON OF A THERMAL TRANSFER PRINTER

[75] Inventor: Don S. Ende, Commack, N.Y.

[73] Assignee: Miltope Corporation, Melville, N.Y.

[21] Appl. No.: 127,154

[22] Filed: Dec. 1, 1987

[51] Int. Cl.[4] .............................................. G01D 15/10

[52] U.S. Cl. ................................ 346/76 PH; 346/1.1; 346/21; 400/198; 400/120

[58] Field of Search ...................... 346/1.1, 21, 76 PH; 400/719, 120, 198

[56] References Cited

U.S. PATENT DOCUMENTS 4,511,902 4/1985 Nagashima .......................... 400/120

4,531,135 7/1985 Toshima .............................. 346/1.1

FOREIGN PATENT DOCUMENTS 0208271 7/1984 Japan .................................. 400/198

0090789 5/1985 Japan .................................. 400/120

*Primary Examiner*—E. A. Goldberg

*Assistant Examiner*—Huan H. Tran

*Attorney, Agent, or Firm*—Gottlieb, Rackman & Reisman

[57] ABSTRACT

A thermal transfer printing mechanism having an arrangement for removing or obliterating the image left on the ribbon after printing is provided. The arrangement includes a heated roller which contacts the ribbon. Heat applied to the ribbon causes the ink remaining along the underside thereof to liquify and spread so as to cover or disguise the image left on the ribbon.

16 Claims, 2 Drawing Sheets

FIG. 2
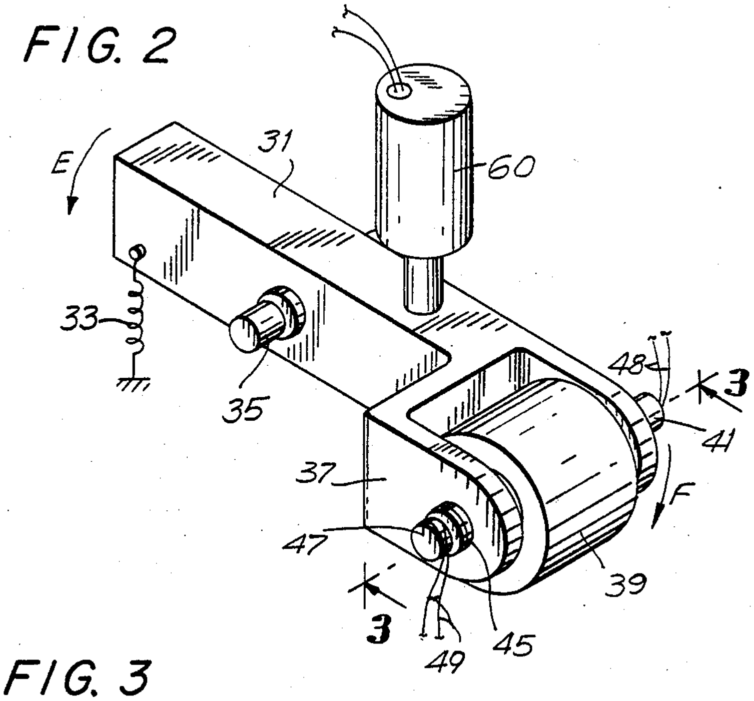
FIG. 3
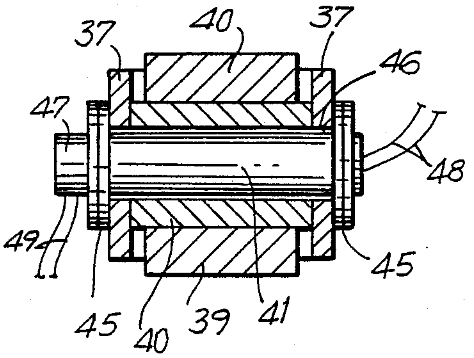
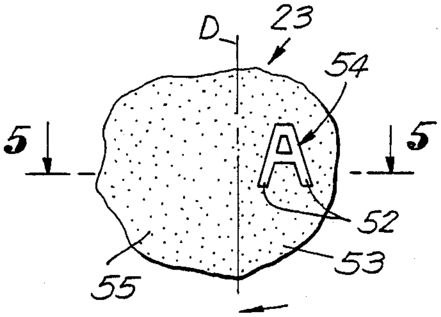
FIG. 4
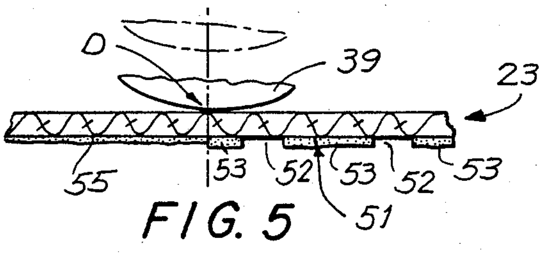
FIG. 5

APPARATUS AND METHOD FOR REMOVING AN IMAGE FROM THE RIBBON OF A THERMAL TRANSFER PRINTER

DESCRIPTION

BACKGROUND OF THE INVENTION

This invention relates to an apparatus and method for removing an image from the ribbon of a thermal transfer printer after the printing process has taken place. In particular, the method involves the use of a heated roller which is applied to the ribbon in order to liquify the wax based ink remaining on the ribbon so as to obliterate the image previously left thereon.

It is generally known that thermal transfer printing mechanisms include a disposable printing ribbon in contact with a thermal printhead in order to cause the transfer of ink coated along the ribbon to a receptor surface, which is usually a sheet of paper. The printhead typically contains minute resistors arranged in a row and positioned so that they come into contact with the ribbon along a line which is substantially perpendicular to the direction of movement of the ribbon during operation of the printing mechanism. When an electrical current is passed through the resistors, the heat generated therefrom causes the ink coated along the ribbon to be transferred to the sheet of paper. In order to create the desired printout, the number and location of dots to be printed in each row, and the longitudinal incrementing of ribbon movement perpendicular to the array of resistors on the printhead, as well as the longitudinal incrementing of paper movement, are properly selected, usually under microprocessor control.

However, conventional thermal transfer printing mechanisms are not completely satisfactory. Because a negative image of the printed character is left on the printing ribbon after transfer of the ink to the paper, it is possible to read the printed message by examining the ribbon after use in the printer. It is known that thermal transfer printers are commonly used to print airline tickets, credit card transaction receipts, etc., the content of which may include credit card numbers, fares and other proprietary or sensitive information. Therefore, if disposal of the spent thermal transfer ribbon is not adequately achieved, unauthorized persons may be able to reconstruct that information by merely examining the spent ribbon. Consequently, the secrecy of that information cannot be maintained unless additional security measures are employed (security guards, hidden cameras, etc.), necessitating further expenses.

Accordingly, it is desirable to provide a printing mechanism in which the images left on the ribbon during the printing operation are removed or obliterated.

SUMMARY OF THE INVENTION

Generally speaking, in accordance with the present invention, a thermal transfer printing mechanism having an arrangement for removing the image left on the printing ribbon is provided. The arrangement includes a heated roller which contacts the ribbon after printing. The heat app-lied to the ribbon causes the remaining ink along the underside thereof to liquify and spread in order to cover or disguise the image left on the ribbon. Moreover, once liquefaction of the ink occurs, some of the melted ink is either coated onto or absorbed by the underlying ribbon layer.

In the preferred embodiment, the printer includes a printhead and resilient roller between which the printing ribbon and receptor surface are passed during the printing operation. The printhead is pressed against the uncoated side of the ribbon, which transfers an ink image from the ribbon to the receptor surface, resulting in a "negative" of the printed image being left on the underside of the ribbon.

After the ribbon passes between the printhead and the resilient roller, it is wound on a spool and is brought into contact with a heated roller. The roller includes a heating device journaled therethrough, whose temperature is controlled by means of a thermistor. Consequently, when the "spent" ribbon portion contacts the roller, the ink along the underlying surface is heated and liquified, as discussed above.

Accordingly, it is an object of the present invention to provide a mechanism for removing the image left on a printing ribbon after printing takes place.

Still another object of the invention is to provide a ribbon image removal mechanism which utilizes heat to liquify the remaining portion of ink.

Still another object of the invention is to provide a mechanism which prevents use of the spent ribbon for obtaining information regarding the content of what was printed.

Still other objects and advantages of the invention will, in part, be apparent from the following specification.

The invention therefore comprises an apparatus having the features of construction, combination of elements and arrangement of parts which are herein described, and a method having the steps and the relation of such steps with respect to the others, all as exemplified in the following detailed disclosure, and the scope of the invention will be indicated in the claims.

BRIEF DESCRIPTION OF THE DRAWINGS

For a fuller understanding of the invention, reference is made to the following description taken in connection with the accompanying drawings, in which:

FIG. 2 is a perspective view of the heated roller assembly of a printer in accordance with the invention;

FIG. 3 is a cross-sectional view taken substantially along line 3—3 of FIG. 2;

FIG. 4 is a bottom plan view of a printing ribbon during contact with the heated roller shown in FIGS. 2 and 3; and FIG. 5 is an enlarged cross-sectional view taken substantially along line 5—5 of FIG. 4.

DETAILED DESCRIPTION OF PREFERRED EMBODIMENTS

Figure 1:
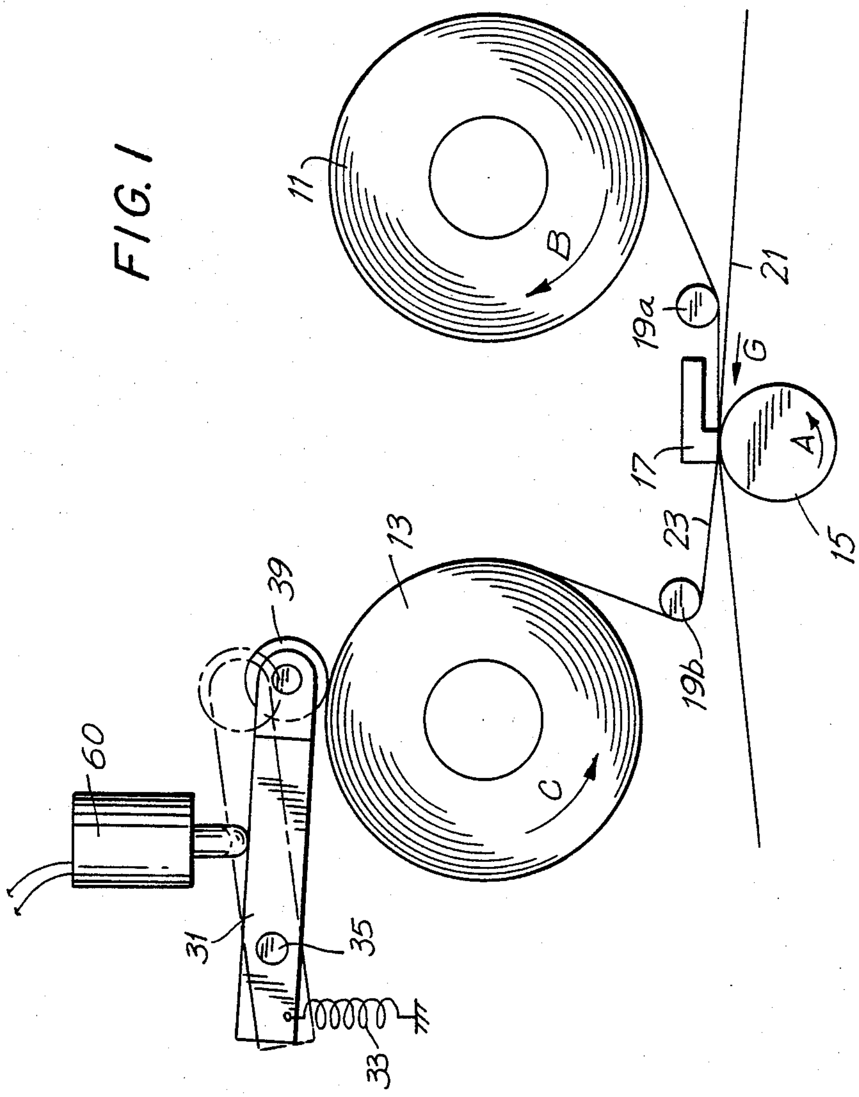
FIG. 1 is a side elevational view showing the overall printing mechanism of a thermal transfer printer in accordance with the invention.

Reference is first made to FIG. 1, which illustrates the printing mechanism of a thermal transfer printer in accordance with the invention. The printing mechanism includes a resilient roller 15 and a printhead 17, all of which are of conventional construction well known in the art. A continuous sheet of paper 21 passes between printhead 17 and roller 15 in response to the rotation of roller 15, as shown by arrow A in FIG. 1. A printing ribbon 23 passes between paper 21 and printhead 17, and moves from ribbon supply spool 11, which rotates in the direction of arrow B, to ribbon take-up spool 13, which rotates in the direction of arrow C. A motor, not shown connected to the shaft on which take-up spool 13 rotates, winds the ribbon onto take-up spool 13 in the direction shown by arrow C. The movement of printing ribbon 23 between printhead 17 and roller 15, as shown in FIG. 1, is aided by guide wheels 19*a* and 19*b* positioned behind and in front of printhead 17, respectively.

During printing, as shown in FIG. 1, roller 15 rotates in the direction of arrow A, thereby driving paper 21 and ribbon 23 in the direction shown by arrow G. Simultaneously ribbon 23 is unwound from supply spool 11 in the direction shown by arrow B and wound onto take-up spool 13 in the direction shown by arrow C. Printhead 17, which contains minute resistors (not shown), contacts ribbon 23 in a direction substantially perpendicular to the direction of movement of ribbon 23. When an electrical current is passed through its resistors, the heat generated therefrom causes the ink disposed along the underside of printing ribbon 23 to transfer onto the surface of paper 21. Therefore, in order to create the desired printout on paper 22, selected resistors of printhead 17 are activated. This deposits a dot row of ink on the paper. Both paper 21 and ribbon 23 are then incremented and another dot row of printout is created. This process is repeated until the proper image is created.

Referring still to FIG. 1, but more particularly to FIGS. 2 and 3, the ribbon image removal mechanism of the invention is now described. As shown in FIG. 2, the image removal mechanism of the invention includes a yoke 31 connected at one end to a spring 33, which biases yoke 31 in a direction shown by arrow E. A shaft 35 is substantially centrally disposed through yoke 31 and pivotally supports yoke 31 in the printer.

The other end of yoke 31 includes a housing 37, in which a roller 39 is journaled for rotation. Roller 39, as shown in FIG. 3, includes a thermally conductive sleeve 40 within which a non-rotating cylindrical heating element 41 extends axially therethrough. An annular gap 46 defined between heating element 41 and conductive sleeve 40 of roller 39 contains a heat transferring lubricant (such as a silicon oil) so that roller 39 can rotate about element 41.

Heating element 41 extends beyond either end of roller 39 and through housing 37, and is retained in place by means of retaining rings 45, as illustrated in FIG. 2. Mounted on one end of heating element 41 is a thermistor 47, which in conjunction with a temperature control circuit (not shown) connected electrically thereto by wires 49, senses the rise and fall of the temperature of heating element 41. An electrical power source (not shown) is connected electrically to the other end of element 41 by wires 48 and selectively supplies current to heating element 41 in response to an electrical signal from the temperature control circuit. As a result, roller 39 is maintained at a substantially constant elevated temperature throughout operation of the printer.

In operation, printing ribbon 23, after use in the thermal printing process, is wound on the hub of take-up spool 13 and is then forced to pass underneath roller 39 of the image removal mechanism. As shown in FIG. 4 and FIG. 5, ribbon 23, prior to contact with roller 39 (at the interface designated by th letter D), includes an underside 51 which contains the negative image 54 of the letter "A", for example, imprinted thereon. Negative image 54 is formed by the remaining ink 53 on the underside 51 of ribbon 23 after the printing process has taken place. Remaining ink 53 defines channels 52, from which ink is absent, having been previously transferred to the paper during printing, and now outlines negative image 54 of the letter "A".

In order for roller 39 to contact ribbon 23 as it is wound around the hub of spool 13, yoke 31 is provided with a solenoid 60. In response to movement of printing ribbon 23 across printhead 17, solenoid 60 is energized, preferably under microprocessor control. When solenoid 60 is energized, yoke 31 is caused to pivot about shaft 35 in a direction shown by an arrow F, or against the urging of spring 33. Roller 39 may be thereby selectively urged into contact with the top side of ribbon 23 as it is wound along spool 13.

Since roller 39 is heated to an elevated temperature (preferably in the range of 60°-80°), as described above, heat is transferred from roller 39 to ribbon 23 during roller/ribbon contact (designated by the letter D in FIGS. 4 and 5,) which causes remaining ink 53 along ribbon underside 51 to melt. As a result, ink 53 is liquified, flows along underside 51 and fills in channels 52, as shown along underside portion 55 of FIGS. 4 and 5. Consequently, negative image 54 is essentially obliterated. Moreover, once remaining ink 53 is liquified, a substantial portion thereof is either absorbed by or is transferred to the underlying ribbon layer already wound around take-up spool 13, thereby substantially reducing the amount and level of ink along underside 51.

After operation of the image removal mechanism, it will no longer be possible for unauthorized persons to determine the information printed on ribbon 23 during the thermal printing process, since negative image 54 will no longer exist.

Although the image removal mechanism of the present invention is shown in connection with a thermal printing device, it would also be suitable for use in other printing devices, such as an impact printer, so long as it is possible to melt or liquify the ink disposed along the underside of the printer ribbon.

It will thus be seen that the objects set forth above, among those made apparent in the proceeding description, are efficiently attained, and since certain changes could be made in carrying out the above method, and in the construction set forth, without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A printing apparatus comprising:
   - a receptor surface;
   - a printing ribbon having a first surface coated with an image transfer medium and a second surface;
   - means for transferring a selected portion of the image transfer medium to said receptor surface, whereby a negative image is left on said ribbon along said first surface; and
   - means for applying heat to said ribbon to substantially liquify the transfer medium which remains on the first surface of said ribbon, said heat applying means including heated means for selectively contacting said second surface of said ribbon, whereby the image left on the first surface of said ribbon is substantially obliterated.

2. The apparatus of claim 1, wherein said heat applying means further includes means for heating said heated means, and means for selectively urging said heated means into contact with said second surface of said ribbon.

3. The apparatus of claim 2, wherein said heated means comprises a heated roller.

4. The apparatus of claim 3, wherein said urging means comprises a support shaft, a yoke rotatably mounted about said support shaft, and means at one end of said yoke for rotatably mounting said roller therein.

5. The apparatus of claim 4, wherein said selectively urging means further includes means for biasing said yoke towards a first position wherein said roller is not in contact with said ribbon, and means for driving said yoke towards a second position wherein said roller is in contact with said ribbon.

6. The apparatus of claim 5, wherein said biasing means comprises a spring connected to said yoke.

7. The apparatus of claim 5, wherein said driving means comprises a solenoid in contact with said yoke.

8. The apparatus of claim 3, wherein said means for heating said roller comprises a heating element disposed axially through said roller and a means for controlling the temperature of said roller.

9. The apparatus of claim 8, wherein said temperature control means comprises a thermistor and a temperature control circuit.

10. In a printing apparatus including a receptor surface and a printing ribbon having a first surface coated with an image transfer medium and a second surface, a method for removing the image which remains on the first surface of said ribbon after a selected portion of said transfer medium is transferred to said receptor, said method comprising applying heat to said ribbon by selectively contacting said second surface of said ribbon with a heated member to substantially liquify said transfer medium which remains on the first surface of said ribbon.

11. The method of claim 10, wherein said heated member is a roller and said heat applying step comprises heating said roller and urging said roller into contact with the second surface of said second surface of said printing ribbon.

12. The method of claim 11, wherein said heating step comprises activating a heating element disposed axially through said roller.

13. The method of claim 11,, wherein said printing apparatus includes a yoke for rotatably mounting said roller, and wherein said urging step comprises driving said yoke so that said roller contacts said ribbon.

14. The method of claim 13, wherein said driving step includes energizing a solenoid in contact with said yoke.

15. The method of claim 13, wherein said roller contacts said second surface of said ribbon.

16. In a printing apparatus including a printhead, a receptor surface, and a printing ribbon having a first surface coated with an image transfer medium and a second surface, a device for removing the image which remains on said first surface after the printhead transfers a selected portion of the image transfer medium to said receptor surface, the device comprising means for applying heat to said ribbon to substantially liquify the transfer medium whih remains on the first surface of said ribbon so as to obliterate the image left on the first surface of said ribbon, said heat applying means including heated means for selectively contacting said second surface of said ribbon.

* * * * *